(12) United States Patent
Coulson et al.

(10) Patent No.: US 12,732,052 B2
(45) Date of Patent: Sep. 8, 2026

(54) HIGH SPEED AXIAL AIR GAP MOTOR

(71) Applicant: Novanta Corporation, Bedford, MA (US)

(72) Inventors: David Coulson, Radford, VA (US); Elliot Helms, Carmichael, CA (US); Jackson Lamb, Folsom, CA (US)

(73) Assignee: Novanta Corporation, Bedford, MA (US)

( * ) Notice: Subject to any disclaimer, the term of this patent is extended or adjusted under 35 U.S.C. 154(b) by 0 days.

(21) Appl. No.: 18/743,478

(22) Filed: Jun. 14, 2024

(65) Prior Publication Data

US 2024/0421650 A1 Dec. 19, 2024

Related U.S. Application Data

(60) Provisional application No. 63/521,395, filed on Jun. 16, 2023.

(51) Int. Cl.
*H02K 3/42* (2006.01)
*H02K 1/2793* (2022.01)
*H02K 3/47* (2006.01)

(52) U.S. Cl.
CPC ............ *H02K 3/42* (2013.01); *H02K 1/2793* (2013.01); *H02K 3/47* (2013.01)

(58) Field of Classification Search
CPC ........ H02K 1/18; H02K 1/182; H02K 1/2793; H02K 1/2713; H02K 1/274; H02K 1/2788; H02K 1/2795; H02K 1/28; H02K 1/2753; H02K 1/2781; H02K 1/2783; H02K 1/2796; H02K 3/42; H02K 3/04; H02K 3/47; H02K 3/50; H02K 5/02; H02K 5/04; H02K 5/128; H02K 5/1282; H02K 9/223; H02K 9/225; H02K 9/227; H02K 9/02; H02K 9/04; H02K 9/12; H02K 9/22
See application file for complete search history.

(56) References Cited

U.S. PATENT DOCUMENTS 7,105,975 B2 9/2006 Semones et al.
7,468,569 B2 12/2008 Hirzel
(Continued)

FOREIGN PATENT DOCUMENTS

AU 2004302531 A1 3/2005
KR 20060100460 B1 9/2006

*Primary Examiner* — Christopher M Koehler
*Assistant Examiner* — Ahmed F Seck
(74) *Attorney, Agent, or Firm* — BainwoodHuang

(57) ABSTRACT

A motor includes a rotor having a pattern of permanent magnetic portions, and a stator disposed proximate to the rotor. In some arrangements, a stator housing of the stator has a segmented backplane formed of a plurality of metal segments in electrically non-conducting (or non-electrically conductive) thermal contact to provide for heat transfer from the forcer coils to a separate stator mounting structure while minimizing eddy currents and associated effects in the stator housing. In some arrangements, the stator housing of the stator has a coil-housing portion for holding the coils and a distinct mounting portion for attaching the stator to a separate support structure, the coil-housing portion being of an electrically non-conductive material effective to provide for heat transfer from the forcer coils to the mounting portion while avoiding eddy currents and associated effects in at least the coil-housing portion of the stator housing.

8 Claims, 5 Drawing Sheets

(56) References Cited

U.S. PATENT DOCUMENTS

| | | | | |
|---|---|---|---|---|
| 10,107,304 | B2 | 10/2018 | Tsai et al. | |
| 2007/0024147 | A1 | 2/2007 | Hirzel | |
| 2008/0179146 | A1* | 7/2008 | Sullivan | B60L 7/18 188/164 |
| 2016/0111948 | A1* | 4/2016 | Sun | H02K 3/04 310/12.24 |
| 2021/0143695 | A1 | 5/2021 | Park et al. | |
| 2021/0237981 | A1* | 8/2021 | Huber | B61L 15/0062 |
| 2022/0060088 | A1* | 2/2022 | Maier | H02K 9/00 |
| 2022/0069641 | A1* | 3/2022 | Osama | H02J 1/12 |
| 2022/0079749 | A1* | 3/2022 | Patel | A61F 2/2409 |
| 2022/0094243 | A1* | 3/2022 | Kislev | H02K 1/146 |

* cited by examiner

HIGH SPEED AXIAL AIR GAP MOTOR

BACKGROUND

The invention relates to the field of axial air gap motors, both linear and rotary.

SUMMARY

One embodiment is directed to an axial air gap motor which includes a rotor having a pattern of permanent magnetic portions, and a stator disposed proximate to the rotor with an axial air gap therebetween. The stator has a stator housing containing (or including) a set of forcer coils operable to induce motion of the rotor by magnetic interaction therewith. The stator housing has a segmented backplane formed of a plurality of metal segments in electrically non-conducting (or non-electrically conductive) thermal contact to provide for heat transfer from the forcer coils to a separate stator mounting structure while minimizing eddy currents and associated effects in the stator housing.

Another embodiment is directed to an axial air gap motor which includes a rotor having a pattern of permanent magnetic portions, and a stator disposed proximate to the rotor with an axial air gap therebetween. The stator has a stator housing containing a set of forcer coils operable to induce motion of the rotor by magnetic interaction therewith. The stator housing has a coil-housing portion for holding the coils and a distinct mounting portion for attaching the stator to a separate support structure. The coil-housing portion is of an electrically non-conductive (or non-electrically conductive) material effective to provide for heat transfer from the forcer coils to the mounting portion while avoiding eddy currents and associated effects in at least the coil-housing portion of the stator housing.

In some arrangements, the coil-housing portion and mounting portion are separate portions of a unitary member made of the electrically non-conductive material.

In some arrangements, the mounting portion is of a metal material to promote heat transfer from the stator housing to the separate support structure.

In some arrangements, the mounting portion includes an outer wall member of the metal material surrounding both the mounting portion and the coil-housing portion to provide mechanical strength and heat conduction in the stator housing.

Other embodiments are directed to systems, subsystems, apparatus, assemblies, and so on. Some embodiments are directed to various methods, componentry, devices, platforms, etc. which involve a high speed axial air gap motor.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Figure 1:
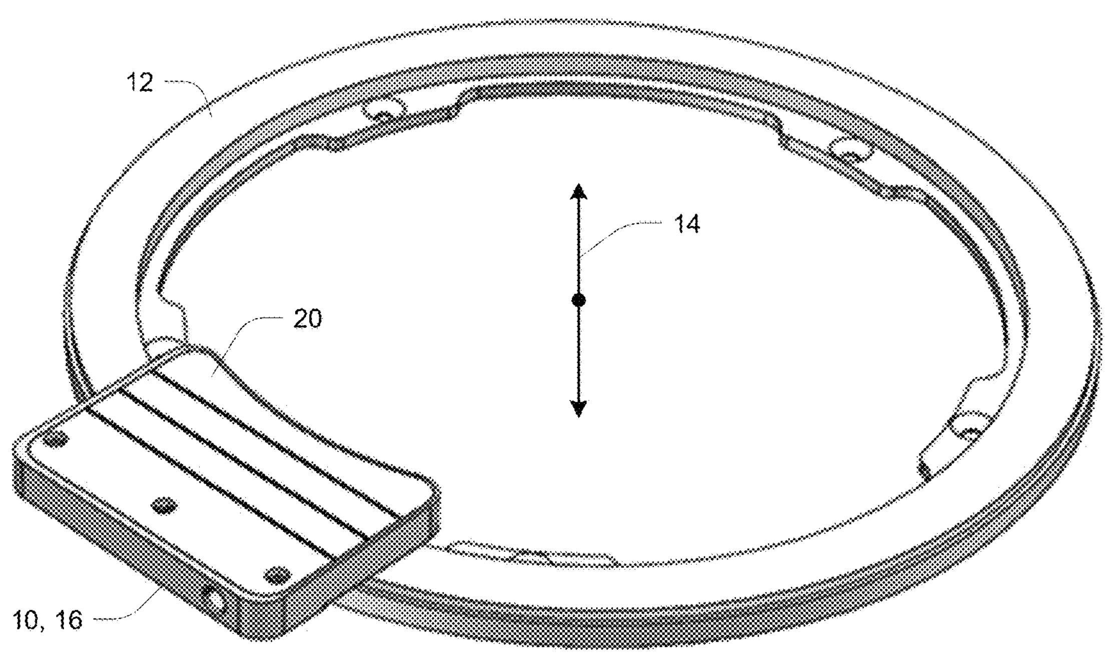
FIG. 1: (Class 1) Isometric view of laminated backplane forcer next to permanent magnet track.

Conventionally, a high pole count slotless and ironless axial air gap motor is operated at a current sufficient to require a heat sink to thermally conduct heat away from the motor windings and limit winding temperature. A frame for the coils serves as a housing and also conducts heat from the coils to a separate heatsink. The presence of an electrically conductive housing serves as an eddy current loss generator in the presence of high frequency magnetic fields. It is necessary to obtain desired balancing of eddy current reduction with sufficient thermal conduction for copper losses to reach a heatsink, all the while ensuring a mechanically robust stator housing which can meet the thermal requirements.

Certain embodiments are directed to an axial air gap motor in which a high-speed, high magnetic pole count solution includes features that provide for operation with low power consumption due to reduced losses. Such apparatus are differentiated from known motors which are characterized by relatively high power consumption in similar operating conditions. A disclosed approach enables running high-speed (high surface feet/min) axial air gap motors with low losses, while also providing for removal of heat (e.g., by conduction or radiation) from the coil assembly (also called forcer or stator). The approach is centered around the use of materials and techniques specific to the coil assembly including non-electrically conductive structures, thermally conductive encapsulants, and/or electrically conductive materials which may be either laminated or unlaminated.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Embodiments are described in which various aspects of the coil assembly of an axial motor (also referred to as "forcer" herein) are made and/or arranged in certain ways that provide the desired eddy current reduction while maintaining thermal conduction for heat removal. The coils may be a full complement of coils engaging 360 mechanical degrees of the rotor or they may be one or more sets of a reduced quantity of coils only engaging a limited angular segment or segments of the rotor.

Four distinct types or classes of embodiments are described below. Class 1 employs an electrically conductive forcer with a segmented arrangement to reduce eddy current losses, while Classes 2—4 have a structure that is at least partially non-electrically conductive:

- Class 1—Segmented (e.g., laminated) electrically conductive elements in the structural makeup of the forcer to reduce eddy currents while maintaining thermal conductivity (to minimize eddy current losses)
- Class 2—Removal of all electrically conductive elements (to minimize eddy current losses)
- Class 3—Removal of electrically conductive elements near the permanent magnets (to minimize eddy current losses), maintain conductive elements away from permanent magnets for structural and heat transfer purposes Class 4—Removal of electrically conductive elements near the permanent magnets (to minimize eddy current losses), with the exception of the body walls of the forcer housing, for structural and heat transfer purposes

EMBODIMENTS

Class 1—Modified Electrically Conductive Elements

Class 1 includes modified electrically conductive elements inside the electromagnetic path from electromagnet to permanent magnet (in close proximity to the permanent magnets) (laminated backplane with intermediate dielectric material). The forcer housing material is constructed of non-electrically conductive materials, electrically conductive plates, insulated plates, or any combination of the three.

Figure 2:
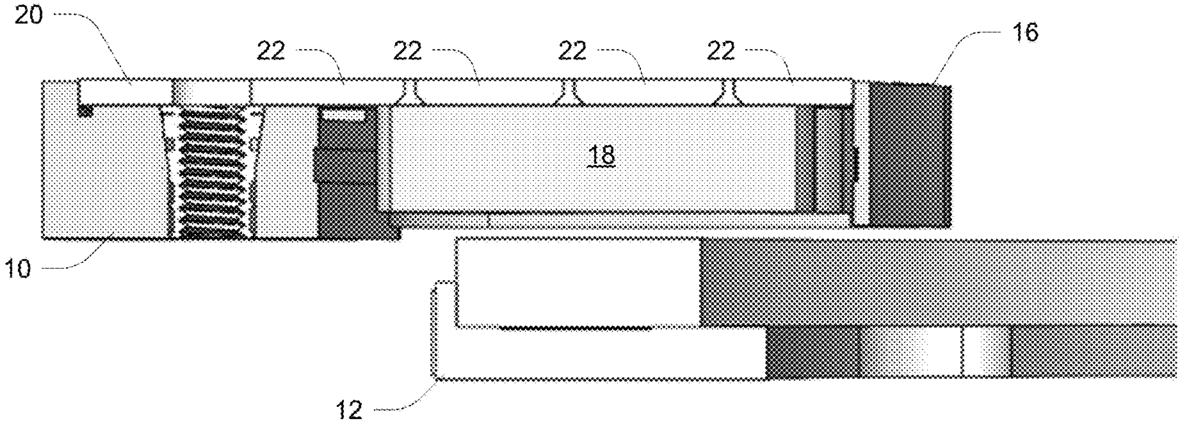
FIG. 2: (Class 1) Section view of laminated backplane forcer showing the laminations, the interface with non-electrically conductive enclosure, and the intermediate insulating material.

FIGS. 1 and 2 show an example embodiment, in the specific form of a linear arc (LARC) motor having a stator 10 and a circular rotor 12 which rotates about a central axis 14 in response to forces generated by interaction with the stator 10. The stator 10 is disposed in close axial-spaced relationship to the rotor 12. The stator 10 includes a housing 16 that contains one or more coils 18 connected to external circuitry (not shown) that provides coil current to create magnetic fields that interact with permanent magnets of the rotor 12 to produce forces that induce its rotational motion. Examples of permanent magnet arrangements of a rotor are shown in other examples below. In the illustrated embodiment the housing 16 is of generally rectangular-solid shape, albeit with an arcuate inner face for accommodating the shape of a rotating member (not shown) to which the rotor 12 is attached in use.

The stator housing 16 includes a planar metallic backplane 20 of segmented construction. The individual segments, or plates, 22 are electrically conductive due to their metallic material but have little to no magnetic flux carrying capacity. The plates 22 are preferably in good thermal contact, but not electrical contact, with each other. Thermally, the backplane 20 thus conducts heat away from the internal coils 18 to a separate heat-sinking structure to which the stator 10 is mounted in use. Electrically, the segmenting of the backplane 20 reduces its capacity for carrying eddy currents induced by the strong local magnetic fields generated during use, minimizing associated eddy current losses (which manifest as additional heating). The plates 22 may be arranged with non-conductive gaps therebetween (e.g., using a separate insulative material), or the plates 22 may themselves be coated or otherwise processed to have electrically insulating surfaces (e.g., anodization of aluminum plates) and placed into intimate contact with each other for best conductive heat dissipation. The plates 22 may be electrically interconnected with low frequency conductor for safety ground.

The positioning of the plates 22 is preferably directly above the magnet channel or rotor magnetic field, and they may overlap the magnetic field source in any direction. In an alternative arrangement, both the housing 10 and the plates 22 are radiused (i.e., arcuate) to fit the rotor contour, rather than of substantially rectangular shape as shown. While in the illustrated embodiment, the backplane 20 has four plates 22 extending tangentially and separated radially, alternative embodiments may employ more or fewer plates and/or different segmenting patterns, including for example one in which the plates extend radially and are separated tangentially.

Class 2—No Electrically Conductive Elements Inside or Outside Electromagnetic Path Class 2 does not include electrically conductive elements inside or outside the electromagnetic path from electromagnet to permanent magnet (in close proximity to the permanent magnets) (non-electrically conductive, non-magnetic coil holder, in both coil holder and mounting regions).

Figure 3:
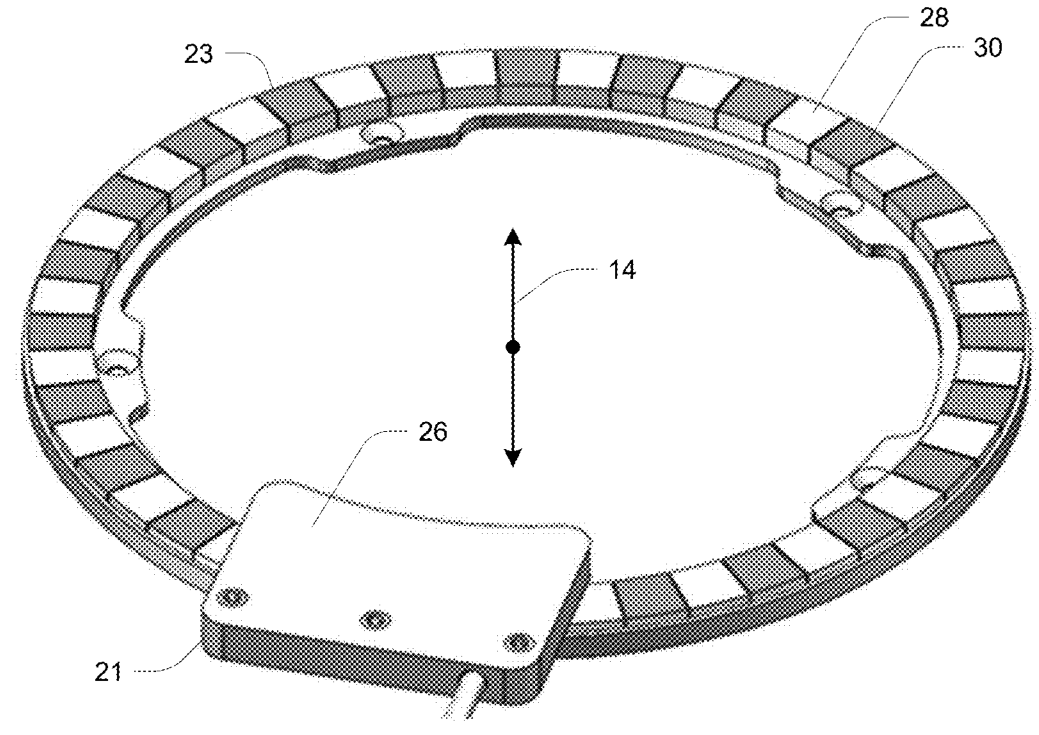
FIG. 3: (Class 2) Isometric view of non-electrically conductive forcer next to permanent magnet track.
Figure 4:
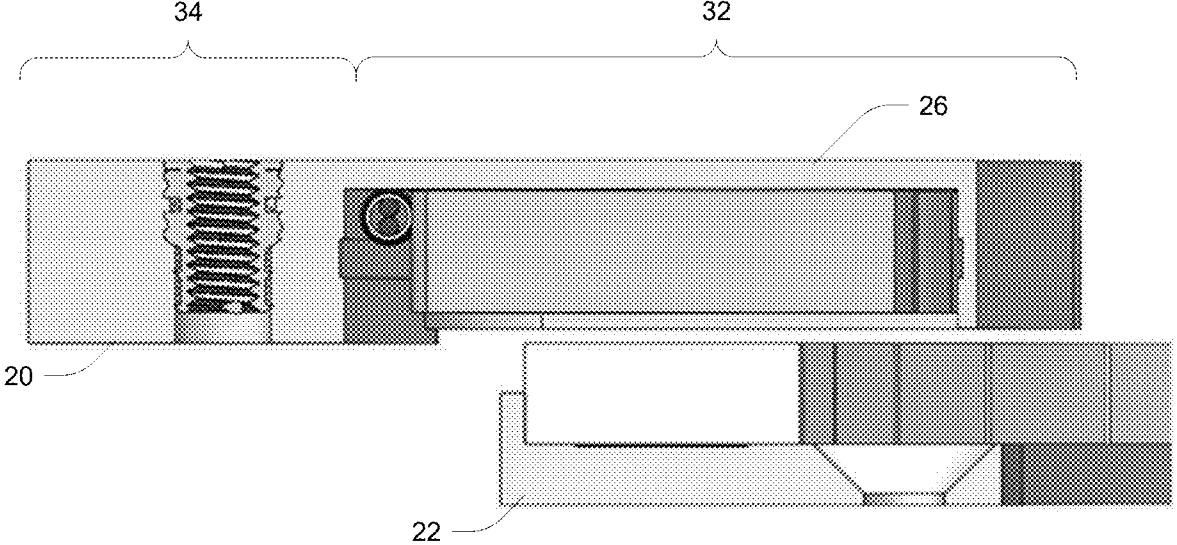
FIG. 4: (Class 2) Section view of non-electrically conductive forcer showing the monolithic structure.

FIGS. 3 and 4 show an example embodiment, having a stator 21 and rotor 23 in similar arrangement as that of FIGS. 1 and 2. In this case, the stator 21 has a housing formed of a unitary member 26 of non-conductive material. FIG. 3 shows alternating magnetic areas 28, 30 of the rotor 23 that establish the magnetic pattern that interacts with the magnetic fields of the stator 21.

The stator housing has a coil-housing portion 32 for holding the coils (not shown) and a separate mounting portion 34 for attaching the stator 21 to a separate support structure (not shown). The member 26 is preferably of a non-conductive material that is effective to provide for heat transfer from the forcer coils to the separate support structure, while avoiding eddy currents and associated effects due to its non-conductive material construction.

Class 3—No Electrically Conductive Elements Inside the Electromagnetic Path

Class 3 does not include electrically conductive elements inside the electromagnetic path from electromagnet to permanent magnet (in close proximity to the permanent magnets) but does include electrically conductive elements outside the electromagnetic path (e.g., fully plastic coil holder region affixed to aluminum mounting block).

Figure 5:
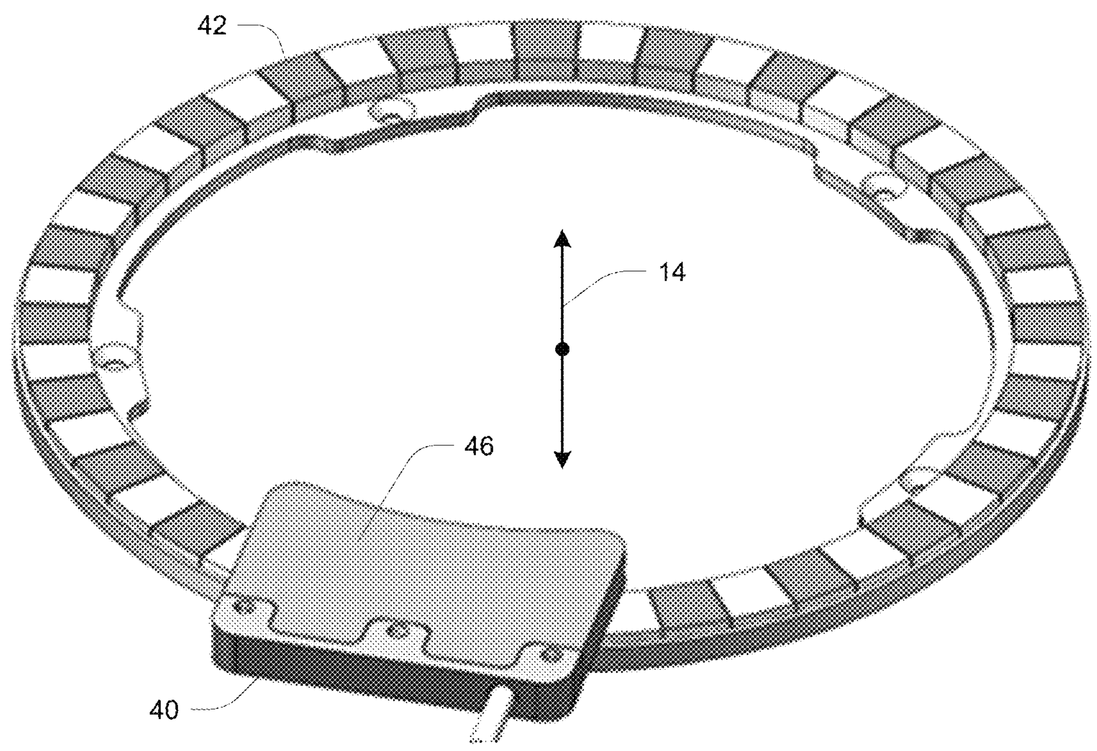
FIG. 5: (Class 3) Section view of hybrid forcer (non-electrically conductive housing mounted with electrically conductive mounting block) next to permanent magnet track.
Figure 6:
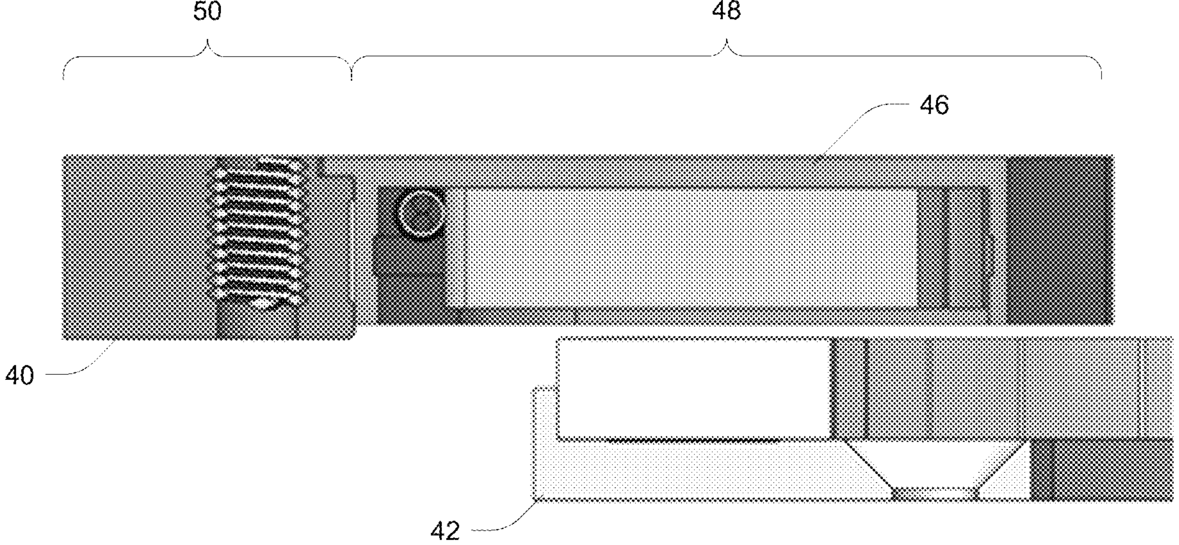
FIG. 6: (Class 3) Section view of hybrid forcer showing the interface between the electrically conductive and non-electrically conductive enclosure.

FIGS. 5 and 6 show an example embodiment, having a stator 40 and rotor 42 in similar arrangement as those of FIGS. 1-2 and 3-4. In this case, the stator 40 has a housing 46 formed of two different materials. The coil-housing portion 48 is preferably of a non-conductive material, similar to that of the unitary member 26 for example, effective to provide for heat transfer from the forcer coils to the mounting portion 50, while avoiding eddy currents and associated effects due to its non-conductive material construction. Meanwhile, the mounting portion 50 is preferably of a metal material for improved thermal conduction to the separate support structure. While this arrangement may have non-zero eddy currents due to the metal construction of the mounting portion 50, these are minimized both by the narrow shape of the mounting portion and its location away from the coils and high-field-strength areas.

Class 4—Selected Electrically Conductive Elements Inside the Electromagnetic Path Class 4 includes electrically conductive elements inside the electromagnetic path from electromagnet to permanent magnet (in close proximity to the permanent magnets). The body walls of the forcer housing may be made from thermally and electrically conductive material with no segmented plates (e.g. aluminum or other non-flux-carrying material). The forcer coils are secured mechanically with electrically non-conductive encapsulant, or equivalently, to a non-electrically conductive plate.

Figure 7:
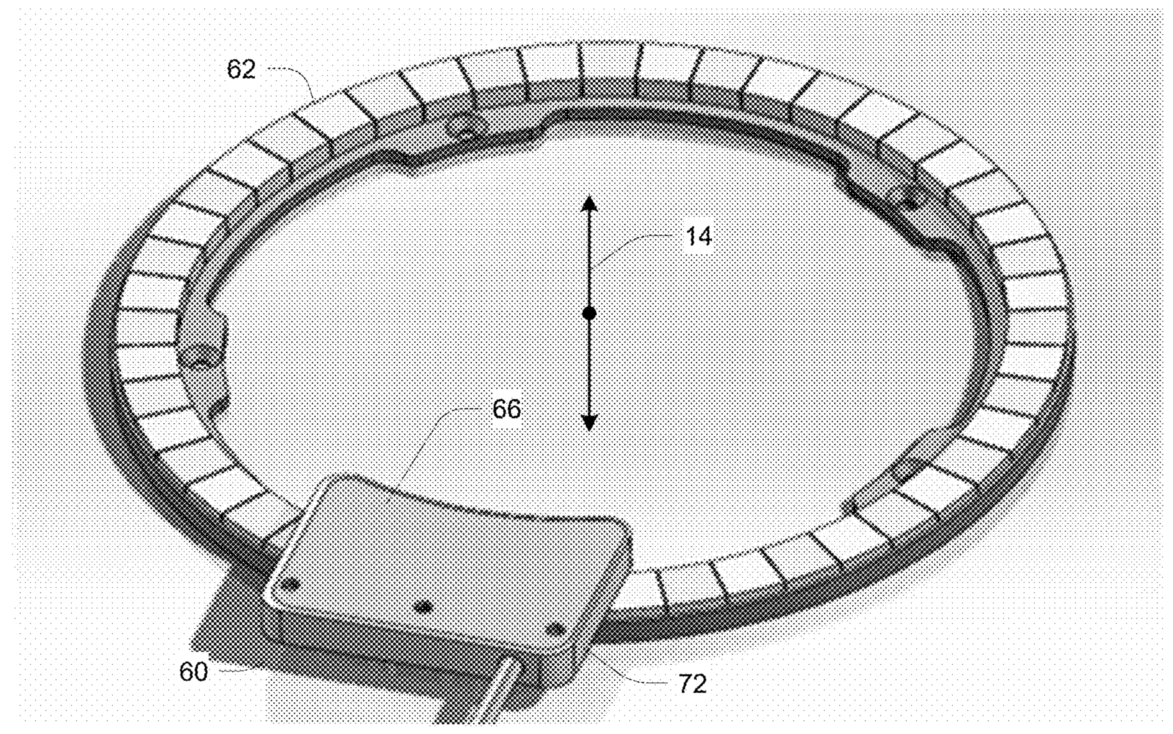
FIG. 7: (Class 4) Isometric view of hybrid forcer (electrically conductive body with non-electrically conductive backplane) showing the interface between the conductive and non-conductive enclosure.
Figure 8:
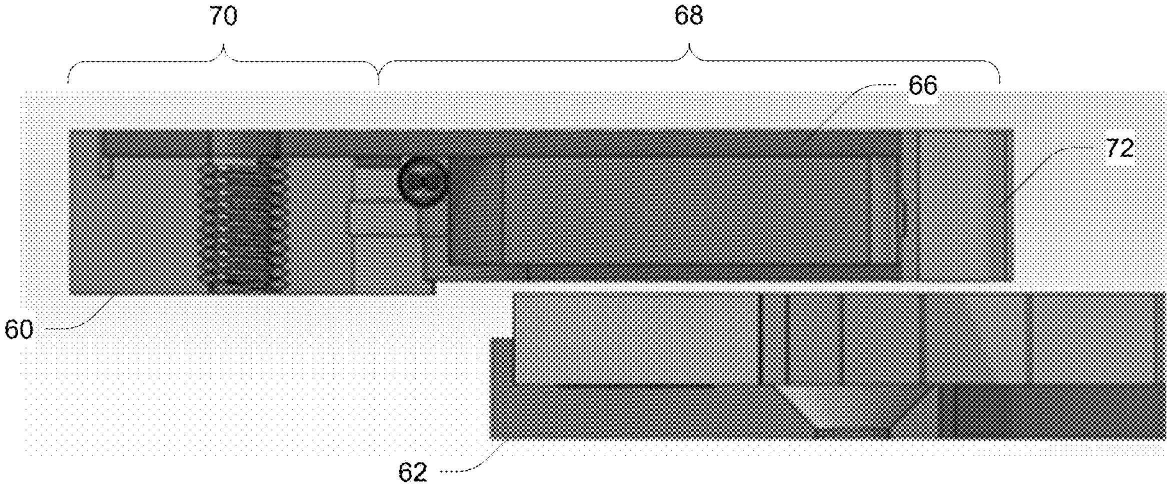
FIG. 8: (Class 4) Section view of hybrid forcer showing the interface between the electrically conductive and non-electrically conductive enclosure.

FIGS. 7 and 8 show an example embodiment, having a stator 60 and a rotor 62 in a similar arrangement as those of FIGS. 1-2, 3-4, and 5-6. In this case, the stator 60 has a housing 66 formed of two different materials. A portion of the coil-housing portion 68 and/or the mounting portion 70 is preferably of non-conductive material, similar to that of the unitary member 26 for example, effective to provide for heat transfer from the forcer coils to a separate support structure while avoiding eddy currents and associated effects due to its non-conductive material construction. Additionally, at least one of the body walls of the housing 66 is preferably of a metal material for improved mechanical strength and thermal conduction to the separate support structure. While this arrangement may have non-zero eddy currents due to the metal construction of one or more body walls, these are minimized by the their location away from the coils and high-field-strength areas and/or other geometrical features as explained above in connection with the other embodiments.

In some arrangements, the coil-housing portion 68 is non-metallic except for one or more body walls of the housing 66. Here, the mounting portion 70 may include conductive material which extends into the coil-housing portion 68 (e.g., an extension of a body wall). Along these lines, the mounting portion 70 may be of a metal material to promote heat transfer from the stator housing to the separate support structure. In particular, the mounting portion 70 may include an outer wall member 72 of the metal material extending across (or even surrounding) both the mounting portion 70 and the coil-housing portion 68 to provide mechanical strength and heat conduction in the stator housing 66.

Figure 9:
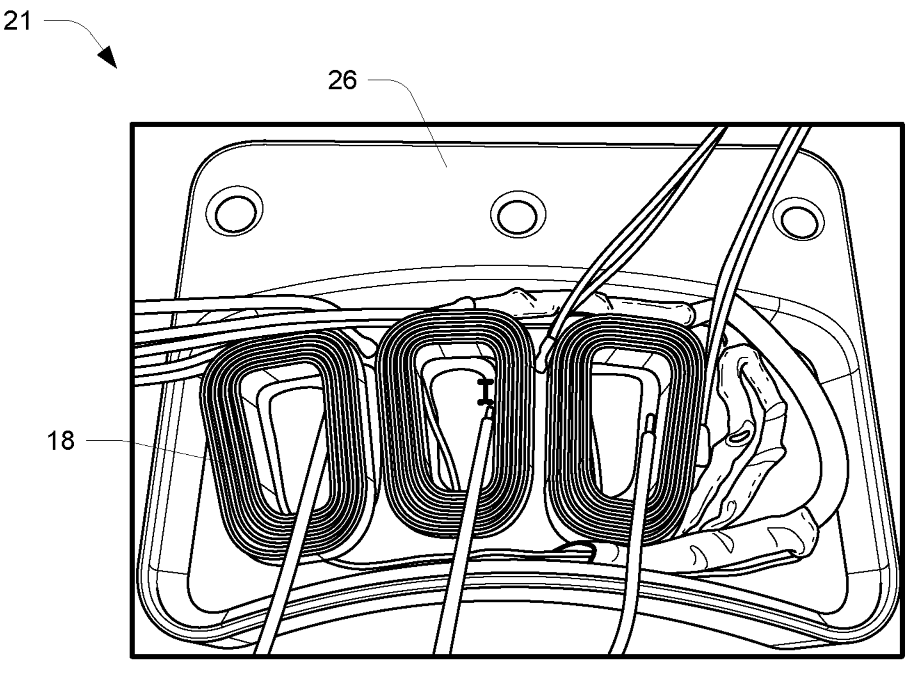
FIG. 9 is a planar view of an interior of the Class-2 (electrically non-conductive) forcer showing three side-by-side wire coils disposed in and supported by the forcer housing.

FIG. 9 is a planar view of the Class-2 stator 21 (FIGS. 3-4) showing three side-by-side wire coils 18 disposed in and supported by the housing 26. This is an example of a slotless and ironless arrangement, i.e., there is no flux-carrying core structure on which the coils 18 are wound.

Figure 10:
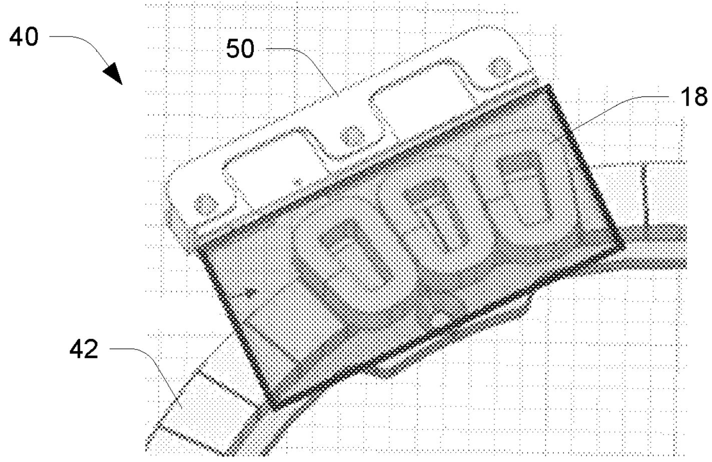
FIG. 10 is a view of the Class-3 arrangement of FIGS. 5-6 with the forcer housing in phantom, illustrating location of the forcer coils above the rotor.

FIG. 10 is a view of the Class-3 arrangement of FIGS. 5-6 with the coil-housing portion 48 removed, which illustrates the location of the three side-by-side coils 18 above the rotor 42. It will be appreciated that the other arrangements (FIGS. 1-2, 3-4 and 7-8) also result in similar coil location relative to the respective rotor.

It should be appreciated that the terms electrically non-conductive and non-electrically conductive may refer to materials which are restrictive to electric current flow. However, it should be understood that such materials may nevertheless be conductive in other ways. Along these lines, various electrically insulative materials still provide high thermal conductivity (e.g., to move heat quickly and efficiently). Moreover, such materials may offer other advantages such as reasonable structural/mechanical strength, high durability, low thermal expansion, and so on.

While various embodiments of the invention have been particularly shown and described, it will be understood by those skilled in the art that various changes in form and details may be made therein without departing from the scope of the invention as defined by the appended claims. Such modifications and enhancements are intended to belong to various embodiments of the disclosure.

What is claimed is:

1. An axial air gap motor, comprising:
- a planar rotor having a pattern of permanent magnetic portions; and
- a stator disposed proximate to a planar face of the rotor with an axial air gap therebetween, the stator having a planar stator housing containing and supporting a set of side-by-side forcer coils, the forcer coils being operable to induce motion of the rotor by magnetic interaction therewith, the stator housing being configured and operative to provide heat transfer from the forcer coils to a separate stator mounting structure while minimizing eddy currents and associated effects in the stator housing,
- where the planar rotor is constructed and arranged to rotate about an axis of rotation,
- wherein the planar stator housing and the set of side-by-side forcer coils extend along a plane that passes perpendicularly through the axis of rotation,
- wherein the planar stator housing includes:
  - an electrically non-conductive coil housing portion constructed and arranged to house the set of side-by-side forcer coils, and
  - a distinct metallic mounting portion coupled with the electrically non-conductive coil housing portion, the distinct metallic mounting portion being constructed and arranged to attach the stator to the stator mounting structure, and
- wherein the electrically non-conductive coil housing portion and the distinct metallic mounting portion extend along the plane that passes perpendicularly through the axis of rotation.

2. The axial air gap motor of claim 1, the coil-housing portion being of an electrically non-conductive material effective to provide for heat transfer from the forcer coils to the mounting portion while avoiding eddy currents and associated effects in at least the coil-housing portion of the stator housing.

3. The axial air gap motor of claim 2, wherein the mounting portion is constructed and arranged to promote heat transfer from the stator housing to the stator mounting structure.

4. The axial air gap motor of claim 3, wherein the coil housing portion is a fully plastic coil holder region and the mounting portion is an aluminum mounting portion.

5. The axial air gap motor of claim 3, wherein the mounting portion has a narrow shape substantially away from the forcer coils so as to be located substantially outside a primary magnetic flux field.

6. The axial air gap motor of claim 5, wherein the narrow shape of the mounting portion is provided by narrowed radial-direction thickness of the mounting portion.

7. The axial air gap motor of claim 1, wherein the forcer coils are discrete wire coils configured in a slotless and ironless manner.

8. The axial air gap motor of claim 1, wherein the electrically non-conductive coil housing portion is disposed a first distance from the axis of rotation;
- wherein the distinct metallic mounting portion is disposed a second distance from the axis of rotation, the distinct metallic mounting portion contacting the electrically non-conductive coil housing portion; and wherein the second distance is greater than the first distance to position the distinct metallic mounting portion further away from a generated flux field to minimize eddy currents and associated effects in the stator housing.

* * * * *